(No Model.)

G. N. RAYMOND.
PACKING GASKET.

No. 590,276. Patented Sept. 21, 1897.

WITNESSES
H. A. Lamb
M. J. Keane

INVENTOR
George N. Raymond.
By his Atty.
Geo. D. Phillips.

United States Patent Office.

GEORGE N. RAYMOND, OF BRIDGEPORT, CONNECTICUT, ASSIGNOR OF ONE-HALF TO GEORGE B. PERKINS, OF SAME PLACE.

PACKING-GASKET.

SPECIFICATION forming part of Letters Patent No. 590,276, dated September 21, 1897.

Application filed July 10, 1896. Serial No. 598,646. (No model.)

*To all whom it may concern:*

Be it known that I, GEORGE N. RAYMOND, a citizen of the United States, and a resident of Bridgeport, in the county of Fairfield and State of Connecticut, have invented certain new and useful Improvements in Packing-Gaskets, of which the following is a specification.

My invention relates to an improvement in rubber surface packing; and it consists in certain features that will be more fully described in the following specification.

To enable others to understand my invention, reference is had to the accompanying drawings, in which—

Figure 1:
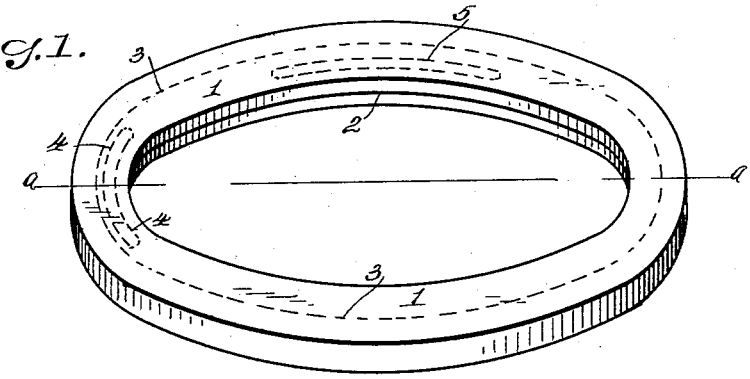
Figure 2:
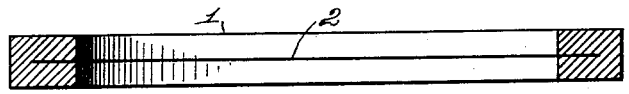
Figure 4:
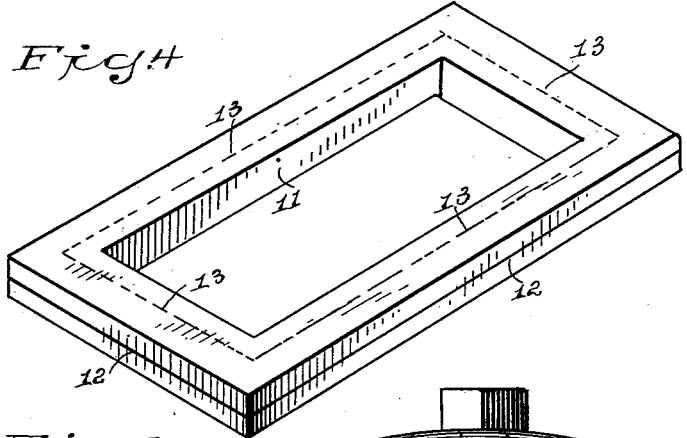
Figure 3:
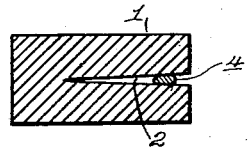
Figure 5:
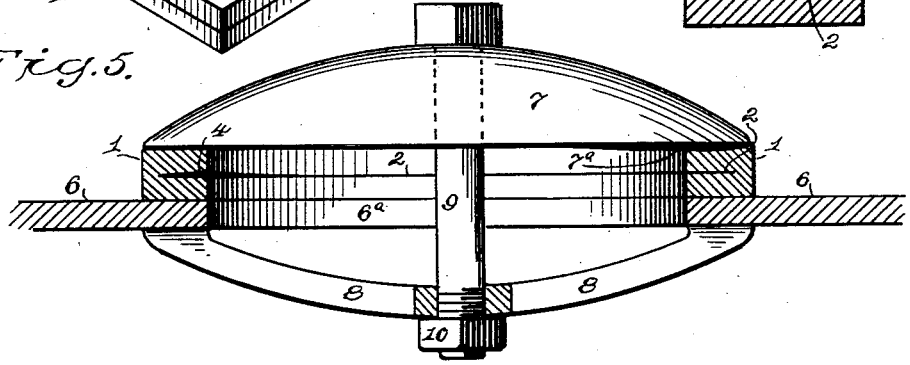

Figure 1 represents a perspective view of an oval packing ring or gasket having a longitudinal opening formed entirely around its inner edge and partially through the same. Fig. 2 is a longitudinal section through line $a$ of Fig. 1. Fig. 3 is a transverse section of a gasket, showing the cut opened and piece of filling or packing inserted therein. Fig. 4 is a perspective view of a square rubber gasket having a longitudinal opening or cut formed around its outer edges and partially through the gasket. Fig. 5 is a section of a boiler-plate having a manhole-opening therein, section of rubber gasket surrounding such manhole, full view of the manhole-plate and bolt therethrough, and spider-clamp on the opposite side of the boiler-plate, showing one of its arms broken off.

Heretofore it has been a difficult matter to make a tight joint with a surface packing, especially when such packing is placed between rough surfaces like, for instance, the surface of a boiler and the manhole-plate overlying the same. In such cases the high uneven surfaces will exert a greater pressure on the rubber packing than will be felt in the other parts, so that a tight joint cannot readily be made. To obviate this, I split one edge of the rubber gasket and carry such splitting entirely around the edge of the same, but not entirely through such gasket, and where the high points occur on the surfaces of the metal I insert on the opposite side of such high points and within the opening in the gasket any foreign substance that will compensate for the difference between the high and low points of the rough iron surfaces.

1, Fig. 1, represents an oval rubber gasket having the cut or opening 2 formed on its inner edge and extending around such gasket, but only partially through its horizontal surface, as indicated by the dotted line 3. 4 and 5 (shown in dotted position) represent strips of any suitable substance inserted within the horizontal cut 2 and placed opposite to where the greatest pressure has formerly been. To illustrate this more clearly, reference is had to Fig. 5, where 6 represents a section of a boiler; $6^a$, manhole therein; 7, manhole-cover or plate; 8, spider-clamp, and 9 retaining-bolt surmounted by the nut 10. The plate or manhole-cover 7 has, what frequently occurs, a high point $7^a$ on its lower face. Consequently when pressure is applied to the manhole-cover it will of course be greatest where this high point is located, and in many cases the rubber gasket immediately under such high point will not yield enough to admit of the opposite side of such gasket being sufficiently compressed to make a tight joint. This difficulty is readily overcome by simply inserting within the cut or opening on such loose or open side a piece of cord or strip of asbestos or other like substance, or in fact anything that will act as a filler to compensate for the unevenness of the iron surfaces between which the gasket is placed. This filler, if of yielding material, like oakum or asbestos, will itself yield and be forced into or compress the upper and under walls of the cut in the gasket, so that the same care need not be exercised as to the quantity used as if some hard unyielding material was employed.

As rubber gaskets of all kinds and descriptions are articles of commerce they would all be properly cut or slit before being placed on the market, so that it is but the work of a moment to insert a packing or filler where needed.

In Fig. 4 the square gasket 11 has the cut 12 on its outer edges, such cut extending to the dotted lines 13. It will be understood, however, that these openings in rubber or other like material used as gaskets may be made on either the outer or inner edges.

The construction above described is not only a great saving of time in making tight and effective joints, but the gasket itself will last much longer.

Having thus described my invention, what I claim as new, and desire to secure by Letters Patent, is—

The herein-described improved packing-gasket provided with the longitudinal cut partially through the same adapted to admit short independent pieces of packing to compensate for uneven surfaces between which such gasket is adapted to be placed, for the purpose set forth.

Signed at Bridgeport, in the county of Fairfield and State of Connecticut, this 22d day of June, A. D. 1896.

GEORGE N. RAYMOND.

Witnesses:
F. A. FAIRCHILD,
LEWIS F. PELTON.